United States Patent [19]

Gilbert et al.

[11] Patent Number: 4,905,781
[45] Date of Patent: Mar. 6, 1990

[54] WATER SKATE

[75] Inventors: Ronald C. Gilbert, Cowes; Robert R. Henvest, Ashurst, both of England

[73] Assignee: H.S.I. Products, Inc., Eddystone, Pa.

[21] Appl. No.: 277,765

[22] Filed: Nov. 30, 1988

[51] Int. Cl.[4] ............................................. B60V 1/16
[52] U.S. Cl. .................................... 180/127; 180/116
[58] Field of Search ................ 180/116, 127, 121, 125

[56] References Cited

U.S. PATENT DOCUMENTS

| 3,211,246 | 10/1965 | Lewis | 180/127 |
| 3,752,253 | 8/1973 | Hopkins et al. | 180/127 |
| 4,122,909 | 10/1978 | Fair et al. | 180/116 |

*Primary Examiner*—Charles A. Marmor
*Assistant Examiner*—Donn McGiehan
*Attorney, Agent, or Firm*—Z. T. Wobensmith, III

[57] ABSTRACT

A fluid-cushion-supported pallet or water skate in which the cushion-fluid is generally defined by a multi-part or segmental, flexible skirt, in which the contiguous skirt members have their downwardly and inwardly extending lateral portions flanked by tie portions extending inwardly from the lateral portion toward the space occupied by the fluid-cushion, the contiguous tie portions are secured outwardly of the inner edges to restrict the escape of the cushioning fluid, and the segmental flexible skirt prevents sideways deflection of the skirt segments caused by relative movement between the device and surface over which the device operates.

4 Claims, 6 Drawing Sheets

WATER SKATE

BACKGROUND OF THE INVENTION

1. Field of the Invention

This invention relates to water skates or fluid cushion supported devices of the type which include a segmented, connected, peripheral skirt.

2. Description of the Prior Art

Devices such as load carrying platforms, boats and other fluid cushion vehicles are not new. Such devices have been the object of considerable research and development activity with improvements in operating economy and increased load bearing capabilities being of importance. Examples of fluid cushion supported devices are shown in the U.S. Pat. Nos. to Lewis, 3,211,246; Hopkins, 3,353,617; Hopkins, 3,752,253; Hopkins, 3,579,271; Bliss, 3,420,330; Bonting, 3,219,135; Joyce, 3,756,343; Wulf, 3,894,609; McCreary, 3,532,179; Beardsley, 3,429,395, Schneider, 3,870,121; Cockerell, 3,424,266; Clarke, 3,444,952, U.K. Patent to Gilbert, 1,491,230, Swedish Patent 301,090 and French Patent to Gilbert, 75 38978.

While some of the prior art devices will provide a degree of support and permit the transporting of moderate loads, none of them provide the degree of support needed for heavy loads in excess of 5000 tons. The device of the invention provides the desired degree of support, with improved performance and economy of operation, decreased water consumption, and increased ease of serviceability of its components.

SUMMARY OF THE INVENTION

A fluid cushion supported device is provided which includes a platform having a perimetral cushion fluid-containing flexible skirt which extends both downwardly and inwardly and with a cushion fluid inlet so that incoming fluid is directed towards the flexible skirt.

The principal object of the invention is to provide a fluid cushion supported device which has a cushion fluid-containing flexible skirt that is comprised of a plurality of attached contiguous skirt segments whereby outward escape of cushion fluid and sideways deflection of the skirt segments is restricted.

A further object of the invention is to provide a fluid cushion supported device wherein the skirt segments are provided with reinforced tips for improved wearability.

A further object of the invention is to provide a fluid cushion supported device which enjoys vastly improved performance and decreased water consumption.

A further object of the invention is to provide a fluid cushion supported device wherein the platform is of hollow construction.

A further object of the invention is to provide a fluid cushion supported device wherein the cushioning fluid is redirected towards the center of the platform.

A further object of the invention is to provide a fluid cushion supported device which is simple to construct but durable and long lasting in service.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

It should, of course, be understood that the description and drawings herein are merely illustrative and that various modifications and changes can be made in the structure disclosed without departing from the spirit of the invention.

Like numerals refer to like parts throughout the several views.

DESCRIPTION OF THE PREFERRED EMBODIMENT

Figure 1:
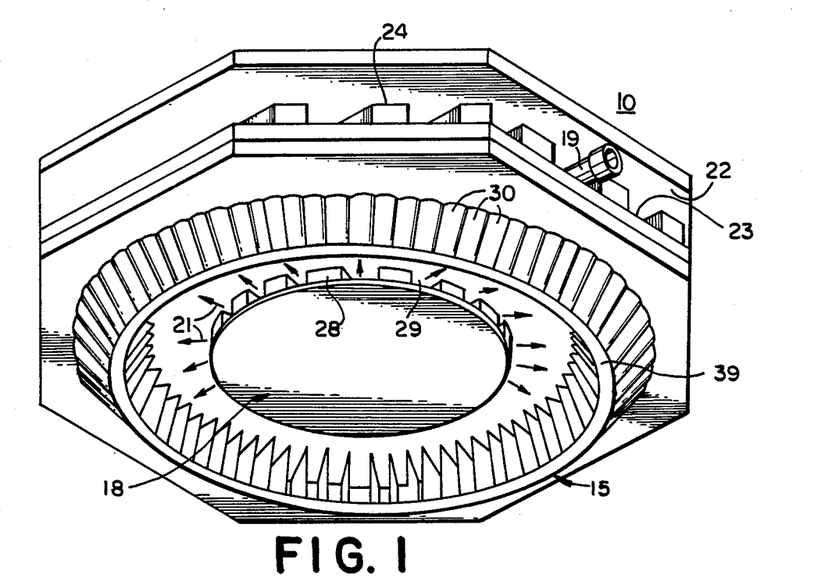
FIG. 1 is a bottom view in perspective, of a non-self propelled embodiment of fluid cushion supported device in accordance with the invention.
Figure 2:
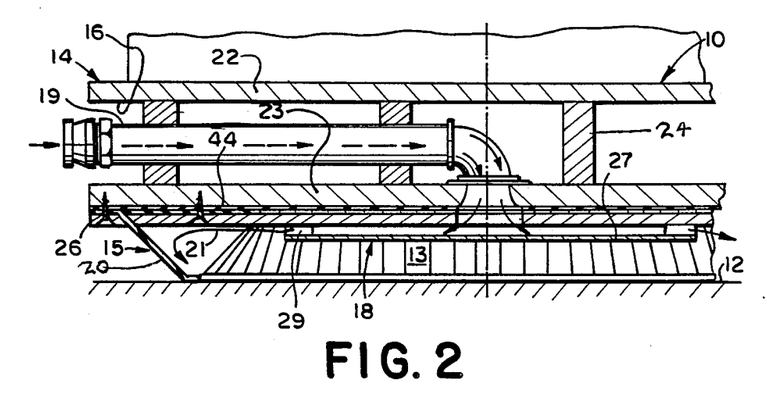
FIG. 2 is a vertical, sectional view, taken approximately on the line 2—2 of FIG. 1.
Figure 3:
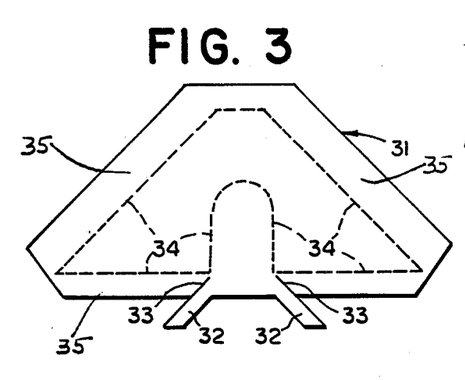
FIG. 3 is a plan view of a blank used in the construction of a flexible skirt segment of the invention.
Figures 11, 12:
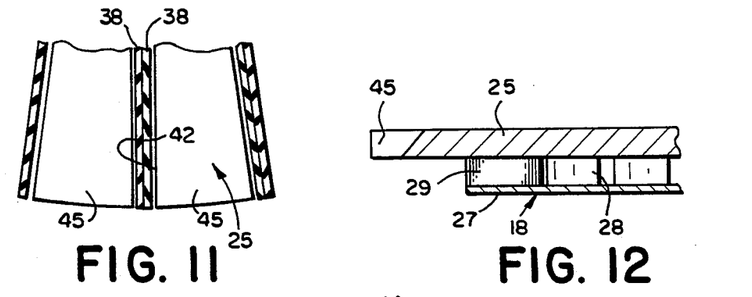
FIG. 11 is a horizontal sectional view, taken approximately on the line 11—11 of FIG. 10.
FIG. 12 is an elevational view, illustrating how incoming cushion fluid is directed towards a flexible skirt segment of the invention.

Referring now more particularly to the drawings and particularly FIGS. 1, 2 and 12, the fluid-cushion-supported device 10 of the invention, in the form of a load-carrying pallet, is shown supported above a surface 12, such as ground, by a cushion 13 of fluid, which may be water under pressure.

The device 10 includes a load-carrying platform 14 of hollow, wooden, construction, which has a cushion fluid containing flexible skirt 15 attached thereto, and extending downwardly from the platform 14. The flexible skirt 15 is of circular configuration, and secured to the underside 16 of platform 14, as described below. In FIG. 2 a load 17 is shown in place on the platform 14 of the device 10.

The device 10 is shown on a surface 12, and is provided with a distributor 18 to direct cushion fluid towards the flexible skirt 15. Cushion fluid, which can be water under pressure, is supplied by an inlet duct 19, which terminates at the center, and is disposed within the hollow portion of the platform 14, and extends to the distributor 18. The distributor 18 directs the water radially outwardly from the center of platform 14, towards the flexible skirt 15. The outer surface 20 of the skirt 15 extends downwardly, so that water discharged from the distributor 18 strikes the outer surface 20 and is deflected inwardly as indicated by arrows 21, to establish and maintain the cushion 13.

The distributor 18 also assists in "priming" or establishing the cushion 13, so that the device 10 can be more easily raised from a resting condition (not shown) on the ground surface 12. The inward deflection of the water by the skirt 15 also tends to reduce escape of water from cushion 13 from beneath the skirt 15. Were it not for the interrelationship between the distributor 18 and skirt 15, discharge of water from the duct 19 would be directly onto the ground surface 12, where some of it would immediately flow outwardly along the surface 12, and under the bottom of the skirt 15 reducing the efficiency and load supporting capacity of the device.

The platform 14 as illustrated, includes upper and lower load-bearing wall panel members 22, 23 of wooden construction, and which are spaced apart by load-carrying pillars 24, which may also be of wood. The panels 22, 23 and pillars 24 are rigidly secured together in any desired manner, such as by screws and adhesive (not shown). The flexible skirt 15 is attached to the platform 14 by inner and outer clamping members 25 and 26. As is best shown in FIG. 12, the distributor 18, which is attached to the underside 16 of the inner clamping member 25, includes a circular panel 27, spaced from the member 25 by radially-disposed blocks 28, which also serve as partition members. The blocks 28 are equi-spaced, and the spaces between them define a plurality of radially-disposed discharge ports of nozzles 29 which are useful to discharge cushion water-under pressure.

Referring now to FIGS. 3 to 9, the manufacture of the flexible skirt 15 is therein illustrated. The skirt 15 comprises a plurality of contiguous skirt segments 30, which are each formed from a blank 31 (FIG. 3) of fabric, which is preferably coated with rubber, and which is of approximately 0.040" in thickness. The blank 31 is of generally triangular form, with the corners cut away. The blank 31 has a pair of tab-like extensions 32, and slots 33, which extend inwardly from the outer edges of the extensions 32. The areas 35 between the edges of the blank 31 and the dotted lines 34 have had the rubber coating removed, to facilitate the subsequent joining together of the areas 35 by adhesive (not shown) of well known type.

Figure 4:
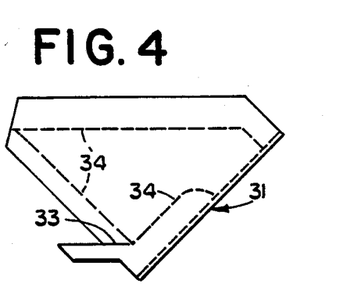
FIG. 4 is illustrative of how the blank of FIG. 3 is folded to form a flexible skirt segment.
Figure 5:
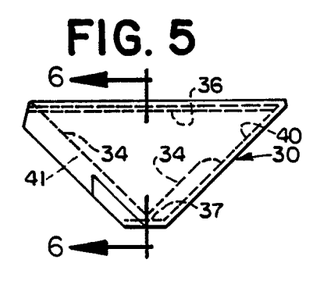
FIG. 5 is illustrative of how the blank of FIG. 3 is folded to form a flexible skirt segment.
Figure 6:
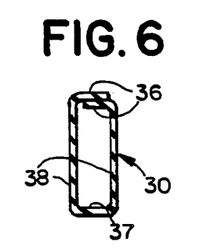
FIG. 6 is a vertical sectional view taken approximately on the line 6—6 of FIG. 5.

To construct a skirt segment 30, 31 the blank is first folded over as shown in FIG. 4. The extensions 32 are then folded back, as shown in FIG. 5, and secured, by adhesive (not shown) to the sides of the blank 31. The folding back of the extensions 32 is facilitated by the slots 33. FIGS. 5 and 6 also disclose how upper parts of the blank 31 are folded over to form an upper wall 36, resulting in a complete skirt segment 30. The folding back of the extensions 32 also provides the skirt segment 30 with a lower wall 37 which is in a substantially horizontal plane, and when the device 10 is moved over the ground surface 12, acts to resist sideways deflection and form an effective cushion seal.

Between the upper and lower walls 36, 37, the skirt segment 30 has a lateral, or cushion-facing portion 37, flanked by a pair of tie portions 38.

Figure 14:
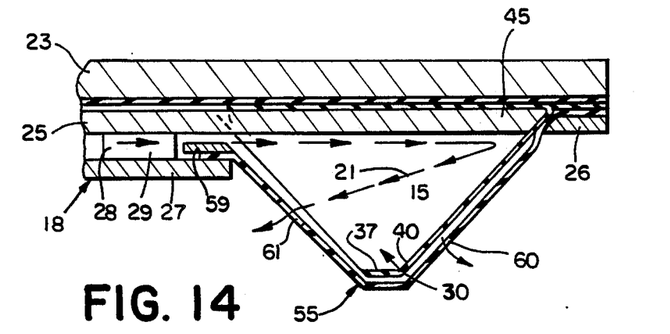
FIG. 14 is a fragmentary, sectional view, enlarged, illustrating another embodiment of the skirt blank of FIG. 8.
Figure 15:
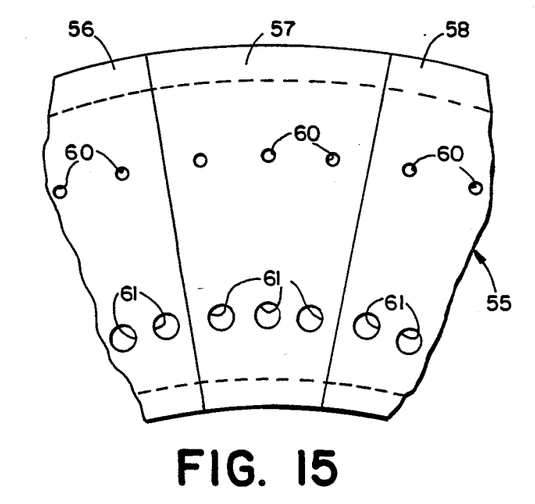
FIG. 15 is a bottom plan view, enlarged, illustrating still another embodiment of the skirt blank of FIG. 8.

As shown more particularly in FIGS. 14 and 15, the lateral portion 37 extends downwardly and inwardly relative to the cushion 13. In addition, the tie portions 38 extend inwardly relative to the cushion 13, and their inner edges extend downwardly and outwardly relative thereto.

Figure 7:
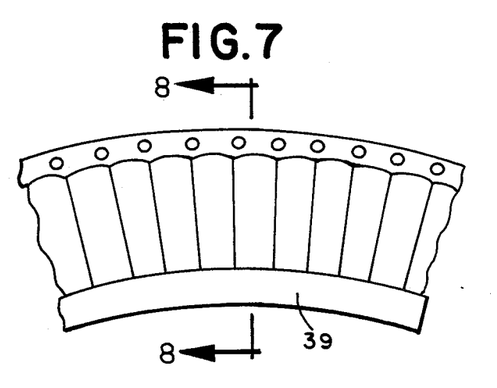
FIG. 7 is a fragmentary, perspective view, of a portion of the skirt illustrating a continuous flap seal and wear strip.
Figure 8:
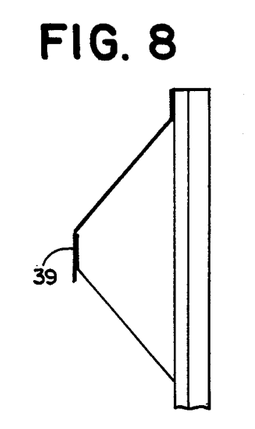
FIG. 8 is a vertical sectional view taken approximately on the line 8—8 of FIG. 7.

To provide for reduced wear on the bottom parts of the skirt segments 30 a continuous flap seal of rubber 39, approximately $\frac{1}{8}$" thick is attached to the lower portion of the segments by any well known vulcanizing process, as illustrated in FIG. 7. To further reduce the outward escape of cushion water, adjacent margins of the side portions 38 are attached to each other, by adhesive of well known type, at attachment areas 41, as shown in FIG. 5, and which are bounded by the dotted lines 34.

Figure 9:
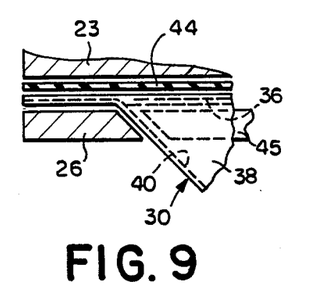
FIG. 9 is an elevational view in partial section, and illustrating how the outer parts of the flexible skirt segment of FIG. 5 are secured in position.
Figure 10:
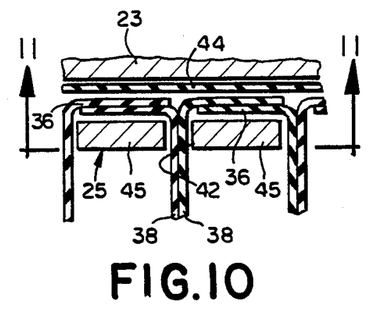
FIG. 10 is a fragmentary, sectional end view, and illustrates how the inner parts of the flexible skirt segment of FIG. 5 are held in position.

Referring now additionally to FIGS. 9, 10 and 11, the skirt segments 30 as illustrated are clamped in place, beneath the platform 14, by the inner and outer clamping members 25 and 26. The inner member 25 is shown as being of circular form, the periphery of which has inwardly extending radial slots 42, to provide a plurality of equi-spaced finger-like portions 43. The skirt segments 30 are mounted on the inner clamping member 25, with adjacent stuck together side portions disposed in the slots 42 and with the upper wall 36 secured to the upper surfaces of the portion 43 by adhesive of well known type. A metal plate of steel or aluminum 44 is disposed between the skirt segments 30 and inner clamping member 25, and panel 23 of the platform 14. The metal plate 44 is fastened to the segments 30 and the clamping member 25, preferably by vulcanizing and extends over the whole area of the platform.

The outer clamping member 26 is shown as being of annular form, and as illustrated in FIG. 9, the outer portions of the segments 30 are squeezed, and along with the sealing membrane 44 are disposed between the panel 23, and outer clamping member 26.

The clamping members 25 and 26 may be secured to the panel 23 by screws (not shown), to clamp the rubberized fabric and metal plate therebetween in a watertight manner. If desired, any well known sealing compound or adhesive may additionally be used on the surfaces of the components.

The adjacent edges of the clamping member 26 and portions 45 of the clamping member 25 are bevelled, so that when they are secured in place, the upper, outer parts of the skirt segments 30 are "pinched", to further reduce any tendency for the local escape of cushion water, and to reduce "peeling" of adjacent adhesively secured parts of the skirt segments 30.

Figure 13:
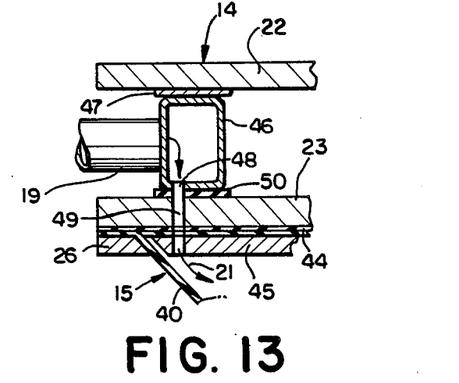
FIG. 13 illustrates another embodiment of the arrangement shown in FIG. 12.

FIG. 13 illustrates an alternate embodiment, wherein the distributor 18 is replaced by another arrangement for directing cushion water towards the flexible skirt 15. In this embodiment the water supply duct is connected to an annular manifold 46, which extends around the periphery of the platform 14. The manifold 46 transfers loads from the panel 22 to panel 23, and to assist in the transfer, an annular packing piece 47 is disposed between the manifold and the panel 22.

A ring of holes 48 extends through the lower wall of the manifold 46, and are aligned with similar holes 49 formed in the membrane 44, and the portions 43 of the inner clamping member 25. An annular sealing membrane 50 of rubberized impregnated fabric is disposed between the manifold 46 and panel 23.

The mode of operation for the embodiment of FIG. 13 will now be pointed out.

In operation, water under pressure, is discharged from the holes 48 of the manifold 46 and the aligned holes 49. The holes 49 form nozzles, and are disposed so that jets of discharged water are directed towards the outer portions 40 of the flexible skirt 15. The jets of water are deflected towards the cushion 13 by the inwardly and downwardly extending portions 40 as indicated by the arrows 21.

In operation cushion pressures can be well over 100 psig, with the rise or hover height of the device being restricted by the depth of the flexible skirt 15, and which rise is presently in the range of one to ten inches.

It should be noted that sealing the flexible skirt segments 30 together, and forming them with substantially horizontal lower walls 37, results in a substantial saving of cushion fluid, which has been calculated to be about 80%.

The construction of the platform 14, with its upper and lower panels 22 and 23 results in a strong unit, which also provides protection to the water supply duct from heavy loads carried by the platform 14, which loads are spread over the platform 14.

Figures 16, 17:
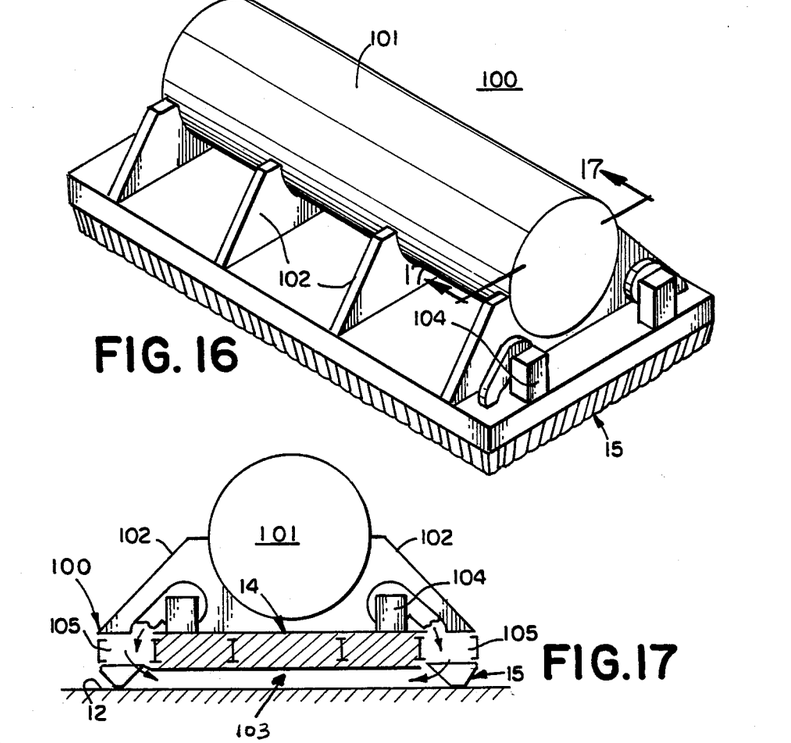
FIG. 16 is a view in perspective of a single fluid-cushion-supported device of the invention, and supporting a heavy load thereon.
FIG. 17 is a vertical sectional view, enlarged, taken approximately on the line 17—17 of FIG. 16.

FIGS. 14 and 15 together show another embodiment. The flexible skirt 15 is enclosed in additional flexible sheet material in the form of a flexible "overshoe" or shroud 55. FIG. 16 is a fragmentary view of the blank of rubberized impregnated fabric which forms the shroud 55. The shroud 55 is of annular form, and is constructed of overlapping sections 56, 57 and 58, which are adhesively secured together. Marginal portions as indicated by the dotted lines in FIG. 16 of the blank form the shroud 55, and are clamped between the panel 22 and outer clamping member 26, and between the panel 27 and an associated clamping member 29. The shroud 55 is not directly attached to the flexible skirt 15, and therefore it can move relative thereto, except where it is clamped. The shroud 55 is perforated by two substantially concentric rings of apertures 60 and 61. The apertures 61 are relatively large, and allow cushion fluid which is entering the interior of the flexible skirt segments 30 by way of the distributor 18 to enter the space occupied by the cushion 13. The apertures 60 are relatively small and prevent any cushion fluid build-up which may escape past the secured segments 30.

FIGS. 16 and 17 show a large device 100 in the form of a transporter, carrying a heavy load 101 on cradle supports 102. In this arrangement the device 100 is supported on a cushion 103 of pressurized air, provided by engine-driven blower units 104, mounted on the platform 14, and initially discharging into plenum chambers 105 formed in the platform 14.

Figure 18:
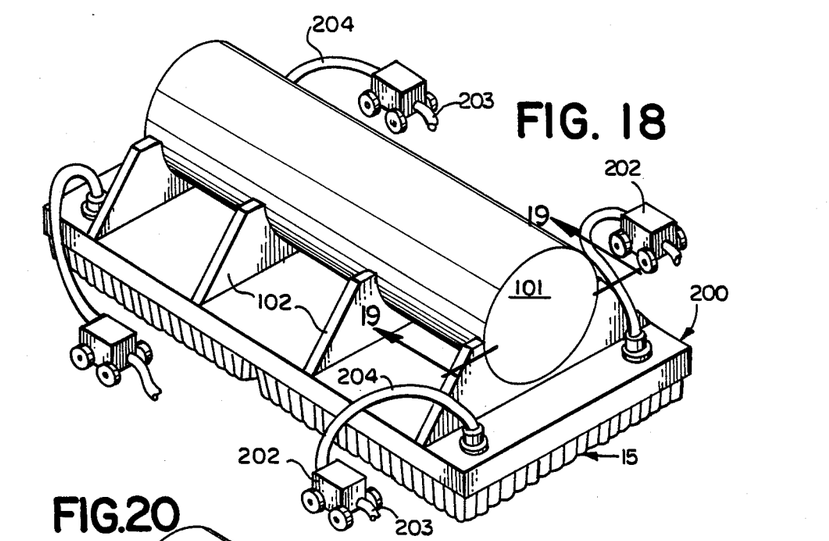
FIG. 18 is a view similar to FIG. 16 and illustrates the load being supported by two devices of the invention.
Figure 19:
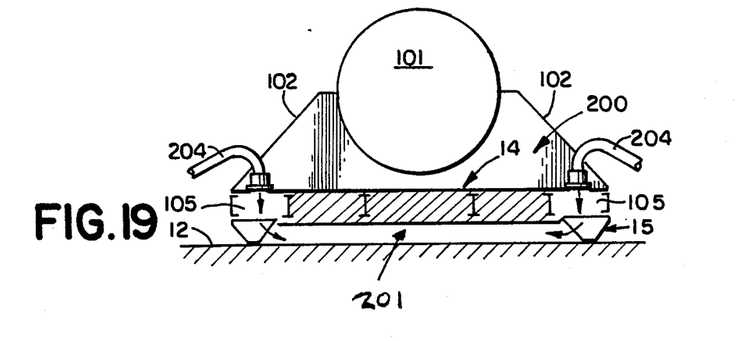
FIG. 19 is a vertical sectional view, enlarged, taken approximately on the line 20—20 of FIG. 19.

FIGS. 18 and 19 show a similar arrangement to FIGS. 17 and 18, wherein a device 200 is supported by two water cushions 201. Water for the two cushions 201 is supplied by portable pumps 202, with inlet and outlet ducts 203 and 204.

The use of more than one supporting cushion is advantageous if a load has to be carried up or down an incline, particularly when water is used as the cushion fluid. With water as a cushion fluid, the water head created as a result of the incline may cause a shift in the centre of pressure of the cushion, which can be troublesome, and would otherwise require the use of movable ballast in order to maintain the center of pressure of the cushion immediately below the center of gravity of the loaded device.

Figure 20:
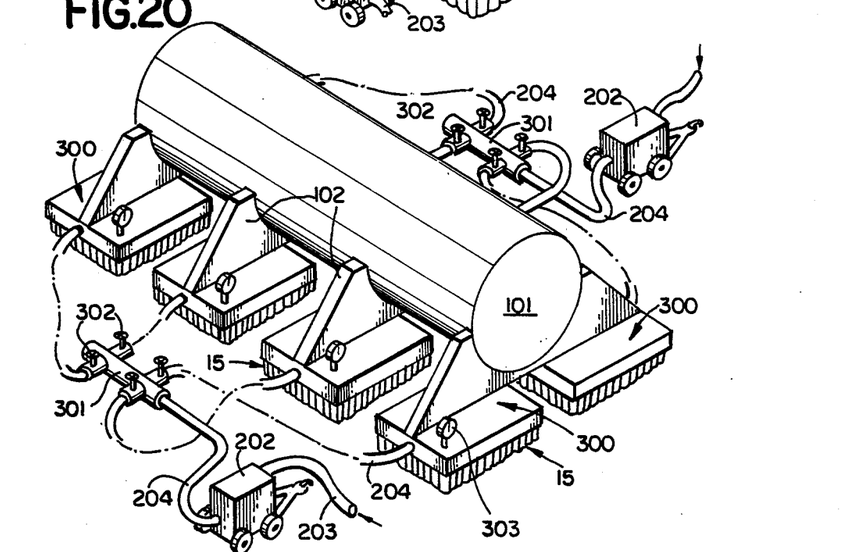
FIG. 20 is another view similar to FIG. 16, and illustrates the load being supported by eight devices of the invention.

FIG. 20 shows the load 101 supported by eight equi-spaced devices 300 disposed in two rows. The devices 300 each also employ water cushions. Manifolds 301 with valves 302 are provided to adjust cushion pressures, each device 300 being provided with a pressure gauge 303 to indicate the cushion pressure.

In the examples shown, the devices 10, 100, 200 and 300 all have flexible skirts, which extend around the perimeter of the platform of each device, which may not be necessary in certain cases.

Although the cushion fluid need not be liquid, use of a liquid has several advantages, as it serves as a lubricant and thereby reduces friction providing easier transport of the device. Additionally, leakage of liquid from beneath the skirt to the atmosphere is small, as is spray formation.

The use of a flexible skirt is advantageous as undulations in the ground surfaces can be accommodated by deflection of the flexible skirt. In addition where the ground surfaces are porous, leakage of cushion fluid can be reduced or prevented by the use of an impervious "carpet" of flexible sheet material, laid in the path of the device.

It will thus be seen that devices have been provided with which the objects of the invention are achieved.

We claim:

1. In a fluid-cushion-supported device, which is provided with cushion fluid inlet means and a cushion-fluid-containing flexible skirt said skirt being formed of a plurality of contiguous skirt segments the improvement which comprises said skirt segments each including an inwardly extending lateral portion flanked by a pair of tie portions extending inwardly from said lateral portions towards the space occupied by the fluid cushion, said tie portion having inner edges which extend downwardly and outwardly relative to said space, said skirt segments having lower portions which are all in a horizontal plane, means for attaching contiguous tie portions of adjacent skirt segments together at said inner edges so as to restrict the outward escape of cushion fluid.

said lower portions of said skirt segments have a continuous flexible horizontal strip attached thereto which extends around the skirt to form therewith a continuous lip seal, and to restrict any tendency for the sideways deflection of the skirt segments caused by relative movement between the surface over which the device is to operate, and the device.

2. A fluid cushion supported device as defined in claim 1 wherein the skirt is provided with a discrete flexible sheet wrapped around the skirt so as to be in contact therewith, and so as to enshroud the continuous lip seal, allowing the lip seal when pressurized to bear down onto the flexible sheet, so that the flexible sheet in the vicinity of the lip seal forms a seal with the ground.

3. A fluid cushion supported device as defined in claim 1 in which said enshrouding sheet is of reinforced rubber or plastic material forming a disposable wearing element, which being vented to allow the escape of the cushion fluid is subjected to frictional wear only.

4. A fluid cushion supported device as defined in claim 1, wherein the cushion fluid from the inlet means is directed outwardly, from within the space occupied by the cushion, towards the flexible skirt, and between the tie portions of the flexible skirt segments thereof whereby it is deflected inwardly by said lateral portions of said flexible skirt segments.

* * * * *